US008858092B2

(12) United States Patent
Donaldson et al.

(10) Patent No.: US 8,858,092 B2
(45) Date of Patent: Oct. 14, 2014

(54) HIGH FIBER COUNT PACKAGE INNER MODULE

(75) Inventors: Christopher Donaldson, Greenville, SC (US); Eddie Kimbrell, Dacula, GA (US); Ted Lichoulas, Simpsonville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 275 days.

(21) Appl. No.: 13/377,307

(22) PCT Filed: Mar. 25, 2011

(86) PCT No.: PCT/US2011/029920
§ 371 (c)(1),
(2), (4) Date: Dec. 9, 2011

(87) PCT Pub. No.: WO2011/123343
PCT Pub. Date: Oct. 6, 2011

(65) Prior Publication Data
US 2012/0076460 A1   Mar. 29, 2012

Related U.S. Application Data

(60) Provisional application No. 61/318,539, filed on Mar. 29, 2010.

(51) Int. Cl.
*G02B 6/36* (2006.01)
*G02B 6/00* (2006.01)
*G02B 6/38* (2006.01)
*G02B 6/44* (2006.01)

(52) U.S. Cl.
CPC ............ *G02B 6/3897* (2013.01); *G02B 6/4459* (2013.01); *G02B 6/4446* (2013.01)
USPC .................. 385/76; 385/84; 385/92; 385/135

(58) Field of Classification Search
CPC .. G02B 6/4452; G02B 6/3897; G02B 6/4454; G02B 6/4455
USPC .......................... 385/76, 84, 92, 94, 134, 135
See application file for complete search history.

(56) References Cited

U.S. PATENT DOCUMENTS

| | | |
|---|---|---|
| 3,445,171 A | 5/1969 | Seidler |
| 4,854,664 A | 8/1989 | McCartney |
| 4,993,800 A | 2/1991 | Shibata |

(Continued)

OTHER PUBLICATIONS

International Search Report, PCT/US2011/029920, dated Jun. 1, 2011.

*Primary Examiner* — Kaveh Kianni
*Assistant Examiner* — Hung Lam
(74) *Attorney, Agent, or Firm* — Sughrue Mion, PLLC

(57) ABSTRACT

Provided is an inner module for holding a plurality of connectors. The inner module includes a first cylindrical portion having a first outer wall spaced radially from a first inner wall to form an annular volume and a second cylindrical portion having a second outer wall spaced radially from a second inner wall to form an annular volume. The inner module also includes a connecting portion to connect the first cylindrical portion to the second cylindrical portion. Each of the first and second cylindrical portions have an opening in an axial direction having a width that is narrower than a distance between the first inner wall and the first outer wall.

14 Claims, 8 Drawing Sheets

(56) References Cited

U.S. PATENT DOCUMENTS

2005/0167147 A1* 8/2005 Marsac et al. ................. 174/92
2007/0286554 A1 12/2007 Kuffel et al.
2009/0185782 A1 7/2009 Parikh et al.
2010/0038130 A1* 2/2010 Zhong et al. ................. 174/520

* cited by examiner

HIGH FIBER COUNT PACKAGE INNER MODULE

CROSS-REFERENCE TO RELATED APPLICATIONS

This application claims the benefit of U.S. Provisional Patent Application No. 61/318,539 filed on Mar. 29, 2010 in the U.S. Patent and Trademark Office, the disclosure of which is incorporated herein in its entirety by reference.

BACKGROUND OF THE INVENTION

1. Field of the Invention

Methods and apparatuses consistent with aspects of the present invention relate to an inner module for use with a high fiber count package.

2. Background of the Invention

As telecommunications and enterprise service providers upgrade their systems from copper trunks to fiber optic trunks to improve data transmissions rates, it is necessary to replace the copper backbones with fiber optic backbones in central offices and data centers or install fiber optic backbones in new central offices and data centers. As part of this upgrade process, High Fiber Count (HFC) fiber optic cable assemblies (fiber optic cable trunks with more than 12 optic fibers which are broken out into individual connectors on one or both ends) are used to build this fiber optic backbone. The break-out end of these High Fiber Count (HFC) fiber optic cables consist of numerous individual fibers terminated with fiber optic connectors which are bulky and difficult to package efficiently and compactly. In the related art, a flexible tube may be fitted over the bundled connectors by heat shrinking the tube or by utilizing cable ties. This methodology makes it difficult to route the cable in ducts, wireways, and in panels due to its size. As a result, installers often will remove this packaging before attempting to install the High Fiber Count (HFC) cable. This creates a risk of damaging the product. Additionally, this packaging methodology makes it difficult to open and reseal this packaging when inspecting and testing fiber optic connectors prior to installation in order to prevent the installation of damaged cables and project delays.

SUMMARY OF THE INVENTION

This invention is related to U.S. Patent Application No. 61/147,265 and PCT/US2010/022037 [High fiber count packaging capsule] (the disclosure of which is incorporated herein in its entirety by reference) in which fiber optic connectors are held in the packaging case in a pocket and retained with a snap-in C-clip. It is also related to U.S. Patent Application No. 61/227,223 and PCT/US2010/042735 (the disclosure of which is incorporated herein in its entirety by reference) in which fiber optic connectors are held in the resealable packaging case using an interior snap feature.

It is an aspect of the present invention to provide an improved apparatus and the method to secure individual fiber optic connectors in a housing 10A, such as the fiber packaging modules described in the two patent applications cited above. More specifically, it is an aspect of the present invention to provide an inner module that is installed into the housings. The inner module is configured to capture a plurality of connectors in a annular volume defined by the inner module.

According one aspect of the present invention, an inner module for holding a plurality of connectors is provided. The inner module comprises a first cylindrical portion having a first outer wall spaced radially from a first inner wall to form an annular volume and a second cylindrical portion having a second outer wall spaced radially from a second inner wall to form an annular volume. The inner module also includes a connecting portion to connect the first cylindrical portion to the second cylindrical portion.

The connecting portion of the inner module may comprise a hinge.

The inner module may be configured such that each of the first and second cylindrical portions have an opening in an axial direction having a width that is narrower than a distance between the first inner wall and the first outer wall. The inner module may also comprise a plurality of connectors positioned within the annular volume.

The inner module is sized such that the distance between the first inner wall and the first outer wall is greater than a cross-sectional width of each of the plurality of connectors. Also, the inner module includes an opening in the axial direction has a width that is less than each of the plurality of connectors.

Further, each of the first cylindrical portion and the second cylindrical portion may comprise an inner member and an outer member, at least one of the inner member and the outer member comprising an overlapping portion to form a snap fit connection between the inner member and the outer member.

According to another aspect of the present invention, a fiber packaging module is provided that contains a plurality fiber optic connectors. The packaging module comprises an outer shell containing a plurality of fiber optic connectors connected to respective fiber optic cables; and an inner module. The inner module comprises a first cylindrical portion having a first outer wall spaced radially from a first inner wall to form an annular volume; a second cylindrical portion having a second outer wall spaced radially from a second inner wall to form an annular volume; and a connecting portion to connect the first cylindrical portion to the second cylindrical portion.

The fiber packaging module may also be configured such that the plurality of fiber optic connectors are disposed with the annular volume of the first cylindrical portion and the second cylindrical portion. The inner module may be sized such that the distance between the first inner wall and the first outer wall is greater than a cross-sectional width of each of the plurality of connectors. Also, the opening in the axial direction has a width that is less than each of the plurality of connectors.

According to another aspect, the fiber packaging module comprises two inner modules disposed adjacent to each other in an axial direction of the fiber packing module.

According to another aspect of the present invention, a method for packaging a plurality of fiber optic cable connectors is provided. the method comprises providing an inner module comprising a first cylindrical portion having a first outer wall spaced radially from a first inner wall to form an annular volume and a second cylindrical portion having a second outer wall spaced radially from a second inner wall to form an annular volume; placing a plurality of connectors into the receiving portions of the an annular volume of the first cylindrical portion and the second cylindrical portion; and connecting the first cylindrical portion and the second cylindrical portion by brining the first outer all and the second outer wall together.

BRIEF DESCRIPTION OF THE DRAWINGS

The above and/or other aspects of the invention will become apparent and more readily appreciated from the fol

DETAILED DESCRIPTION OF THE EXEMPLARY EMBODIMENTS

Hereinafter the non-limiting exemplary embodiments of the present invention will be described in detail with reference to the accompanying drawings.

Figure 1:
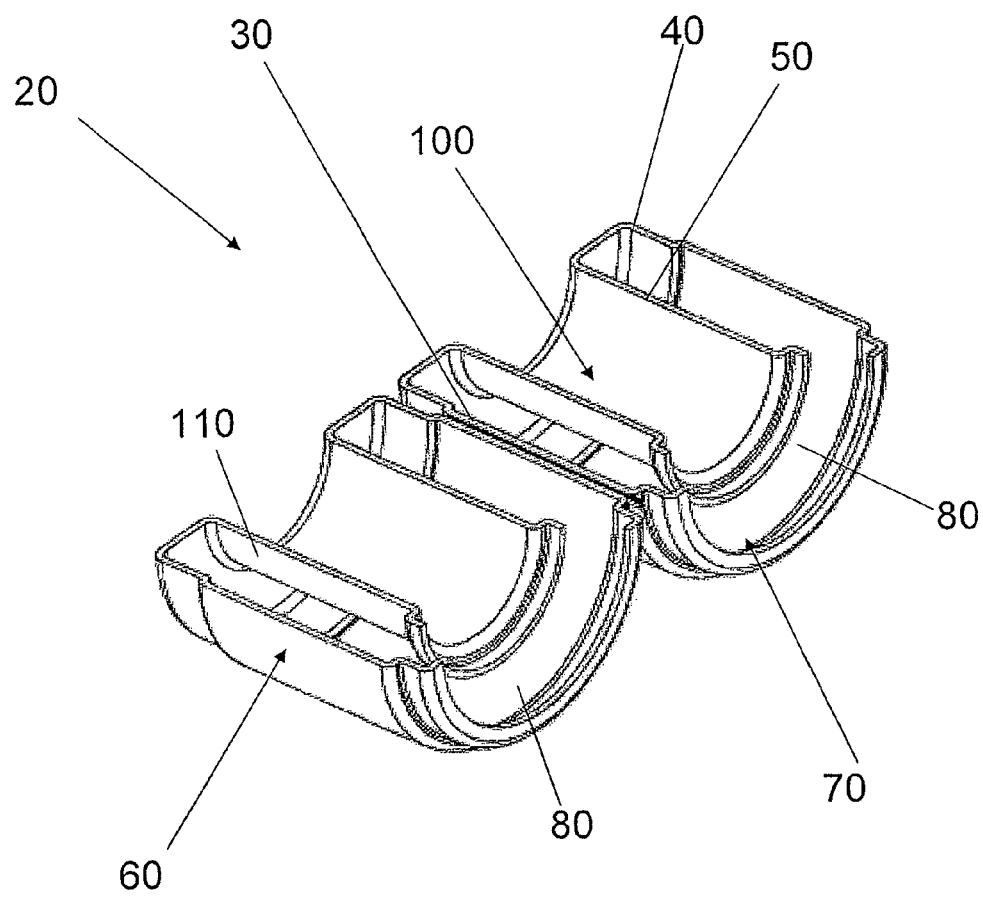
- FIG. 1 is a perspective view showing an inner module according to a first exemplary embodiment.
Figure 2:
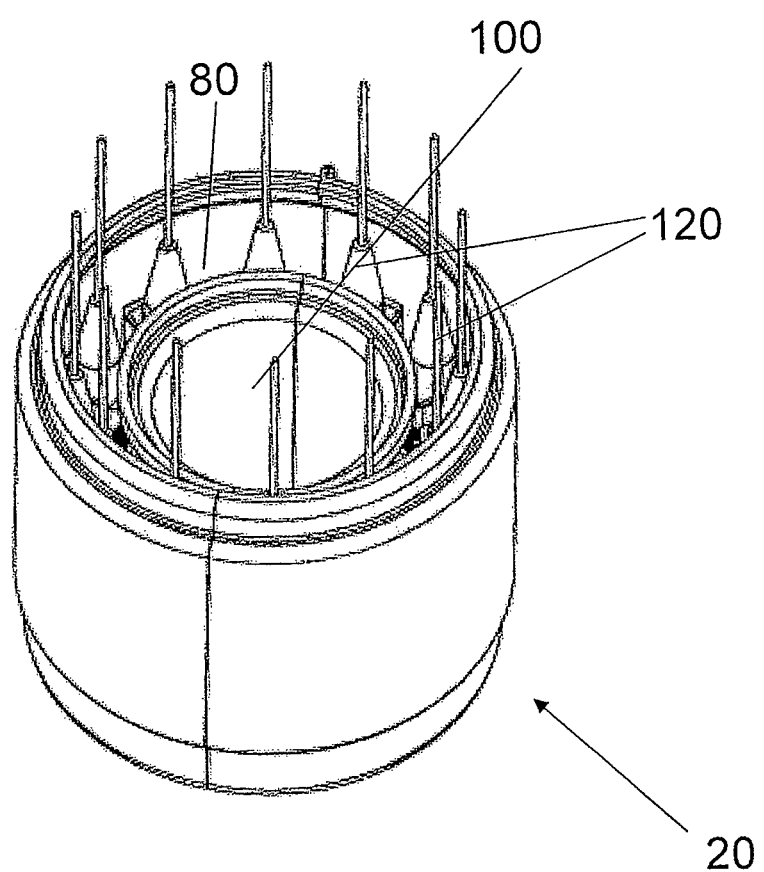
FIG. 2 is a perspective view of the inner module of FIG. 1 having a plurality of fiber optic connectors inserted therein.

The first exemplary embodiment is shown in FIGS. 1 and 2. FIG. 1 shows an inner module 20 made of a plastic or resin material. While the material in this embodiment is described as a plastic or a resin, other materials may be used.

The inner module 20 of this embodiment has a first part 60 and a second part 70 connected by a hinge portion 30. In FIG. 1, the inner module is in an open configuration. In the open configuration, an annular volume 110 is exposed. This annular volume is defined by an inner wall 50 and an outer wall 40. This volume is sized to receive fiber optic connectors of various sizes.

On one axial end of the inner module 20 is an axial opening 80 that extends annularly around the inner module 20. This axial opening 80 has a smaller width in the radial direction that a width of the annular volume 110. The width of the axial opening 80 is sized to be smaller that the largest cross-sectional dimension of the fiber optic connectors to be inserted into the inner module to prevent the fiber optic connector from passing through the opening. On the other hand, the width of the annular volume 110 in the radial direction is set to be wider than the largest cross-sectional dimension of the fiber optic connectors to be positioned inside the annular volume. As a result of the sizing configuration set forth above, the inner module 20 can hold fiber optic connectors of different sizes at the same time.

FIG. 2 shows the inner module 20 after multiple fiber optic connectors 120 have been inserted into the annular volume. After the fiber optic connectors 120 are loaded into the inner module 20, the first part 60 and the second part 70 are rotated about the hinge 30 to close the opening into the annular volume 110. When closed, the fiber optic connectors 120 are secured together within the annular volume 110. Additionally, when in the closed position, the inner wall 50 forms a center opening 100 through the center of the inner module.

Figure 3:
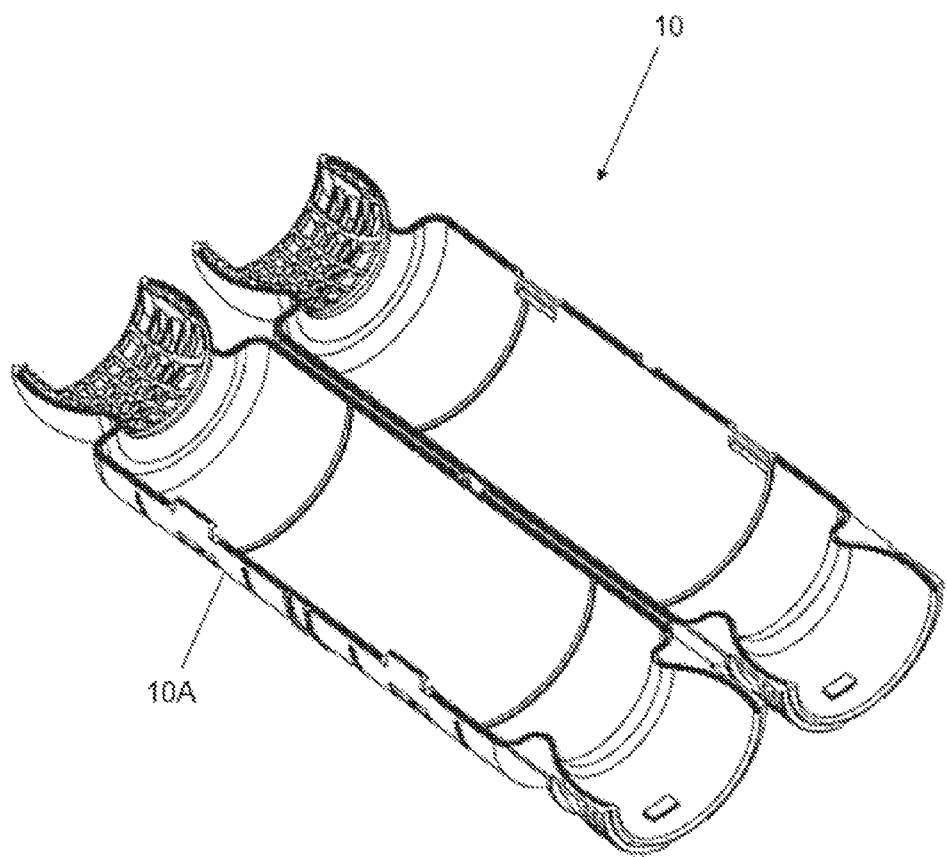
FIG. 3 is perspective view of a fiber packing module.

The inner module 100 is sized to be fitted into and received by a fiber packing module 10 (see FIG. 3). The shape of the outer side surface of the inner module 20 formed by the outer wall 40 is generally configured to fit the inside surface of the fiber packaging module 10 into which it is placed. The inner surface of the fiber packaging module 10 may be formed with grooves or other holding members to prevent the inner module 20 from sliding along its inner surface. Alternatively, the inner module 20 may be adhered to the inner surface using adhesives, tapes or velcro members. The inner module 20 may be held in a closed position by an elastic member, which may also prevent sliding of the inner module 20 with respect to the fiber packaging module 10.

Figure 4:
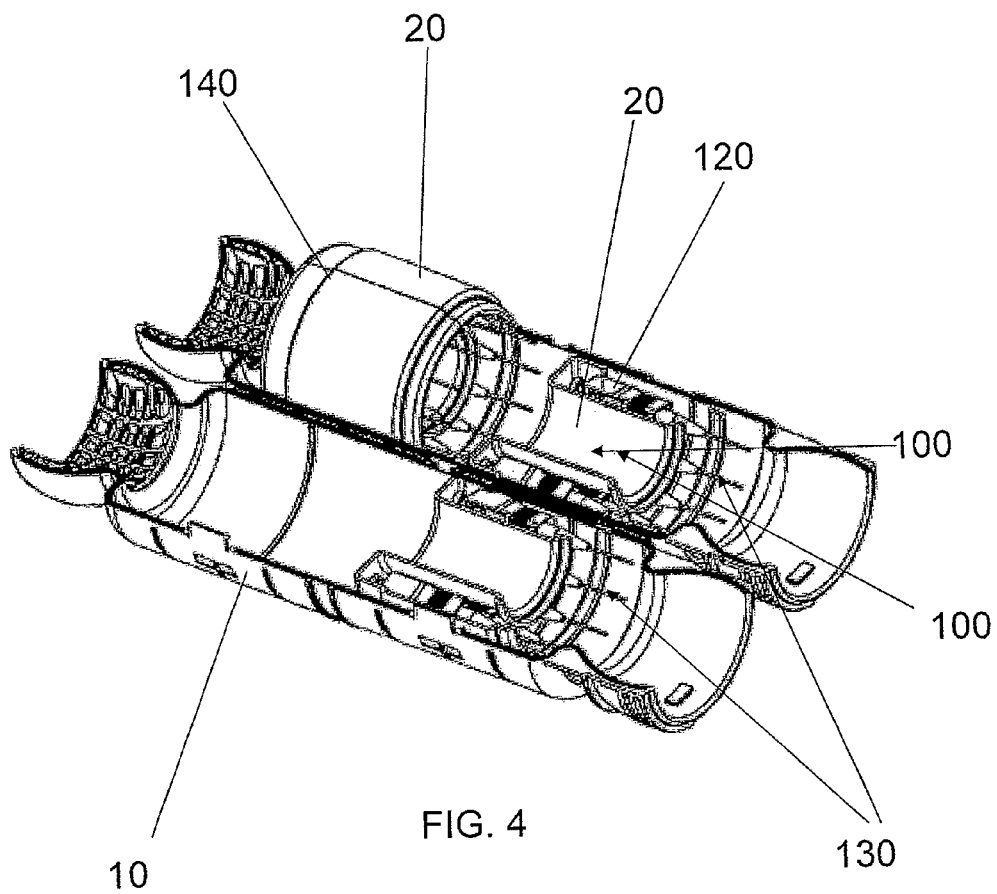
FIG. 4 is a perspective view of the fiber packing module having a plurality of inner modules installed therein.
Figure 5:
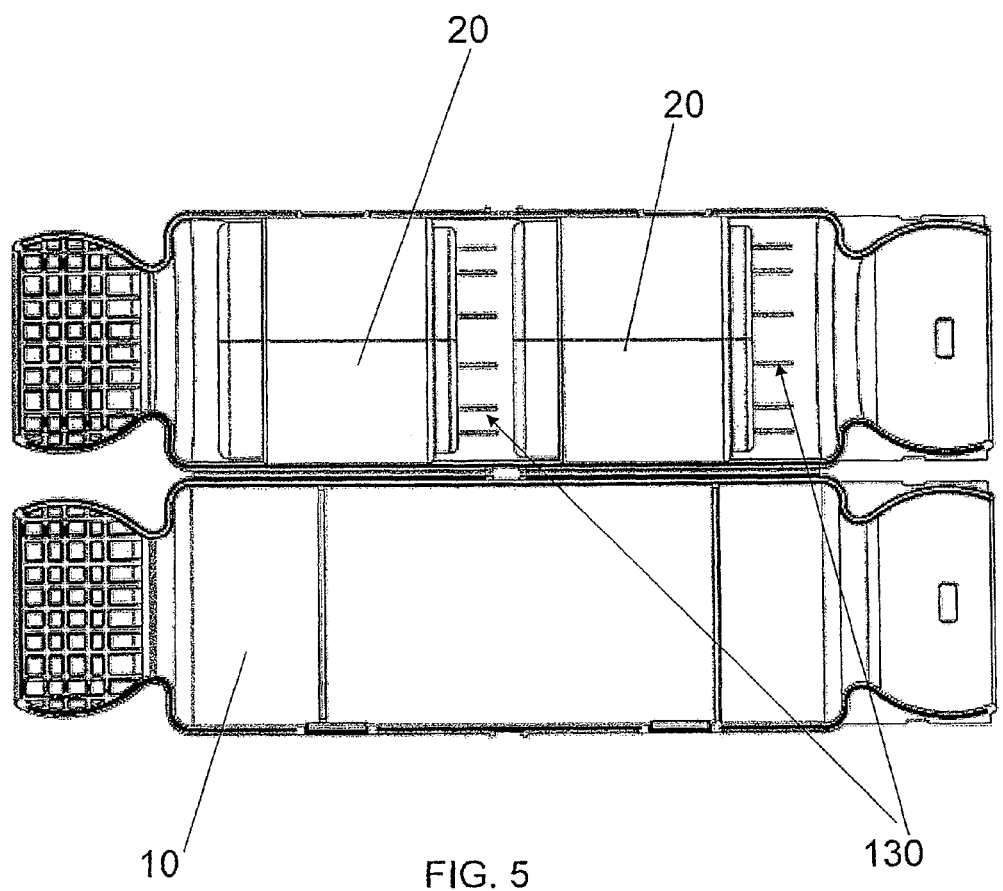
FIG. 5 is a perspective view of the fiber packing module of FIG. 4 wherein the inner modules are closed.

FIG. 4 shows a fiber packaging module 10 having an inner module 20 in a closed position and an inner module 20 in an open position. This figure exemplifies how multiple inner modules 20 may be placed into a single fiber packaging module 10. The inner modules 20 may be fitted with multiple fiber optic connectors 120, each connected to a corresponding optical fiber 130. The optical fiber connectors 120 can be placed into the inner modules 20 either before or after the inner modules 20 are placed into the fiber packaging module 10. After the first inner module 20 is placed into the fiber packaging module 10, it is opened to expose the center opening 100. This enables as user to fit a second inner module 20 into the fiber packaging module by providing an avenue for the optical fibers 130 of the second inner module 20 to extend and exit the fiber packaging module 10. After the optical fibers 130 are positioned within the center opening 100, the first inner module may be closed as shown in FIG. 5.

By using the inner modules 20 as described above, connectors of different sizes may be housed together in a single module. This prevents the tangling of optical fibers while providing the flexibility to route different fiber optic connectors simultaneously within a single fiber packaging module.

Figure 6:
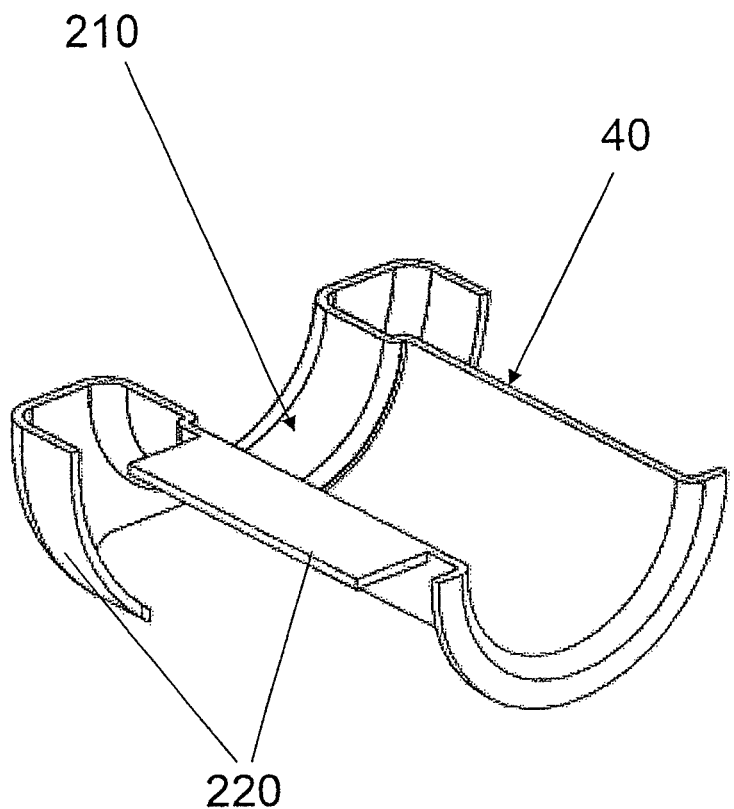
FIG. 6 is a perspective view of an inner portion of an inner module in accord with a second exemplary embodiment.
Figure 7:
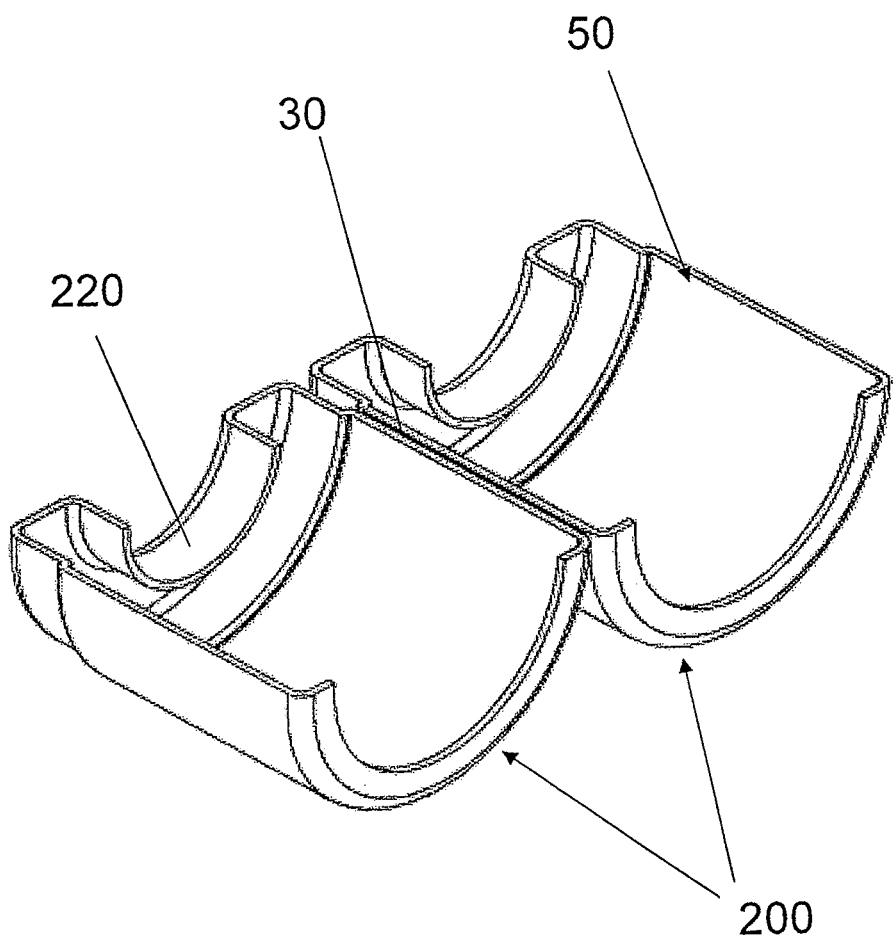
FIG. 7 is a perspective view of an outer portion of an inner module in accord with the second exemplary embodiment.
Figure 8:
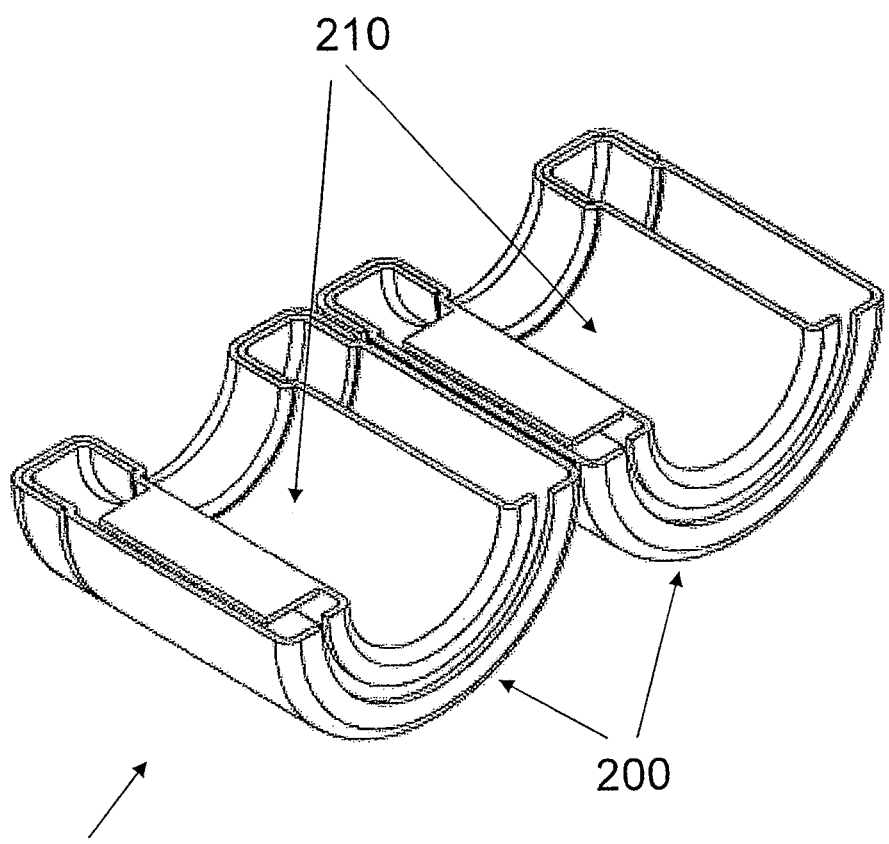
FIG. 8 is a perspective view of an inner module in accord with the second exemplary embodiment.

FIGS. 6-8 illustrate the features of a second embodiment of the present invention. The inner module of this embodiment incorporates the features of the first embodiment describe above. This embodiment comprises an inner member 200 that includes an outer wall 50 as well as other corresponding features of the first embodiment and a separate outer portion 210 that includes an inner wall 40. The outer member 210 may also include a hinge 30, or alternatively, the hinge 30 may be eliminated and the outer member 210 may comprise two separate halves.

The inner member 200 and the outer member 210 are configured to be fitted together by joining overlapping portions 220 on each of the corresponding portions. As shown in FIG. 6, the inner member 200 comprises an overlapping portion 220 that is configured to wrap around the outside of the outer member 210. Additionally, the outer member 210 may be configured with an overlapping portion 210 that is configured to abut the inner wall 40 of the inner member 200. These portions may be either adhered to one another or snap fitted as shown in FIG. 8.

Although a few exemplary embodiments of the present invention have been shown and described, it would be appreciated by those skilled in the art that changes may be made in this embodiment without departing from the principles and spirit of the invention, the scope of which is defined in the claims and their equivalents. Additionally, while the inner modules are described above in combination with optical fiber connectors, the invention is not so limited. Rather, the inner modules may be used with wires or any other type of connector, such as an electrical connector.

What is claimed is:

1. An inner module for holding a plurality of connectors, the inner module comprising:

a first cylindrical portion having a first outer wall spaced radially from a first inner wall to form an annular volume configured to hold the plurality of connectors within the annular volume;

a second cylindrical portion having a second outer wall spaced radially from a second inner wall to form an annular volume; and a connecting portion to connect the first cylindrical portion to the second cylindrical portion.

2. The inner module according to claim 1, wherein connecting portion is a hinge.

3. The inner module according to claim 1, wherein each of the first and second cylindrical portions have an opening in an axial direction having a width that is narrower than a distance between the first inner wall and the first outer wall.

4. The inner module according to claim 1, further configured to hold another plurality of connectors positioned within the annular volume of the second cylindrical portion.

5. The inner module according to claim 3, further configured to hold another plurality of connectors positioned within the annular volume of the second cylindrical portion.

6. The inner module according to claim 5, wherein the distance between the first inner wall and the first outer wall is greater than a cross-sectional width of each of the plurality of connectors which any of the annular volume of the first cylindrical portion and the second cylindrical portion are configured to hold.

7. The inner module according to claim 5, wherein the opening in the axial direction has a width that is less than each of the plurality of connectors which any of the annular volume of the first cylindrical portion and the second cylindrical portion are configured to hold.

8. The inner module according to claim 1, wherein each of the first cylindrical potion and the second cylindrical portion comprise an inner member and an outer member, at least one of the inner member and the outer member comprises an overlapping portion to form a snap fit connection between the inner member and the outer member.

9. A fiber packaging module configured to hold a plurality fiber optic connectors, the fiber packaging module comprising:
   an outer shell containing a plurality of fiber optic connectors connected to respective fiber optic cables; and
   an inner module comprising:
      a first cylindrical portion having a first outer wall spaced radially from a first inner wall to form an annular volume configured to hold the plurality of fiber optic connectors within the annular volume;
      a second cylindrical portion having a second outer wall spaced radially from a second inner wall to form an annular volume; and
      a connecting portion to connect the first cylindrical portion to the second cylindrical portion.

10. The fiber packaging module according to claim 8, further configured to hold a plurality of fiber optic connectors disposed with the annular volume of the second cylindrical portion.

11. The fiber packaging module according to claim 8, wherein the distance between the first inner wall and the first outer wall is greater than a cross-sectional width of each of the plurality of connectors which any of the annular volume of the first cylindrical portion and the second cylindrical portion are configured to hold.

12. The fiber packaging module according to claim 8, wherein the opening in the axial direction has a width that is less than each of the plurality of connectors which any of the annular volume of the first cylindrical portion and the second cylindrical portion are configured to hold.

13. The fiber packaging module according to claim 8, wherein the fiber packaging module comprises two inner modules disposed adjacent to each other in an axial direction of the fiber packing module.

14. A method for packaging a plurality of fiber optic cable connectors, the method comprising:
   providing an inner module comprising a first cylindrical portion having a first outer wall spaced radially from a first inner wall to form an annular volume and a second cylindrical portion having a second outer wall spaced radially from a second inner wall to form an annular volume;
   placing the plurality of fiber optic cable connectors into receiving portions of the annular volume of the first cylindrical portion and the second cylindrical portion;
   connecting the first cylindrical portion and the second cylindrical portion by bringing the first outer wall and the second outer wall together; and
   placing the inner module into a fiber packaging module.

* * * * *